US010106235B2

(12) United States Patent
Choi

(10) Patent No.: US 10,106,235 B2
(45) Date of Patent: Oct. 23, 2018

(54) SHIP EQUIPPED WITH PROPULSION SYSTEM USING WAVE FORCE

(71) Applicant: Korea Maritime and Ocean University Research and Development Business Foundation, Busan (KR)

(72) Inventor: Hyung Sik Choi, Busan (KR)

(73) Assignee: Korea Maritime and Ocean University Research and Development Business Foundation, Busan (KR)

( * ) Notice: Subject to any disclaimer, the term of this patent is extended or adjusted under 35 U.S.C. 154(b) by 0 days.

(21) Appl. No.: 15/719,836

(22) Filed: Sep. 29, 2017

(65) Prior Publication Data

US 2018/0093748 A1 Apr. 5, 2018

(30) Foreign Application Priority Data

Oct. 5, 2016 (KR) .......................... 10-2016-0128122

(51) Int. Cl.
*B63H 19/04* (2006.01)
*B63H 19/02* (2006.01)

(52) U.S. Cl.
CPC ............. *B63H 19/04* (2013.01); *B63H 19/02* (2013.01); *B63B 2209/14* (2013.01); *B63B 2209/18* (2013.01); *Y02E 10/72* (2013.01); *Y02T 70/59* (2013.01)

(58) Field of Classification Search
CPC ........ B63H 19/00; B63H 19/02; B63H 19/04; B63H 11/12; B63B 35/72

USPC ....................................................... 440/9, 13
See application file for complete search history.

(56) References Cited

U.S. PATENT DOCUMENTS

| 1,448,029 | A | * | 3/1923 | Larry | ..................... | B63H 19/02 |
| | | | | | | 440/9 |
| 1,532,459 | A | * | 4/1925 | White | ..................... | B63H 19/02 |
| | | | | | | 440/9 |

FOREIGN PATENT DOCUMENTS

| JP | 58-168999 U | 11/1983 |
| JP | 2010-132112 A | 6/2010 |
| KR | 10-2012-0043844 A | 5/2012 |
| KR | 10-1151330 B1 | 6/2012 |
| WO | WO 2015/126184 A1 | 8/2015 |

* cited by examiner

*Primary Examiner* — Lars A Olson
(74) *Attorney, Agent, or Firm* — Paratus Law Group, PLLC

(57) ABSTRACT

Disclosed is a ship equipped with a propulsion system using wave force, the ship including: a hull; a tube fixed to the hull to be at least partially submerged in water and having a variable volume; a restorer including weights disposed on a bottom in the tube and elastic members pushing down the bottom of the tube to apply restoring force to the tube so that the volume of the tube is restored; an air discharge unit including an air discharge pipe connected to the tube with an end exposed in water and a first valve disposed on the air discharge pipe to open and close the air discharge pipe; and an air suction unit including an air suction pipe connected to the tube with an end exposed to the atmosphere and a second valve disposed on the air suction pipe to open and close the air suction pipe.

9 Claims, 5 Drawing Sheets

[Fig. 1]
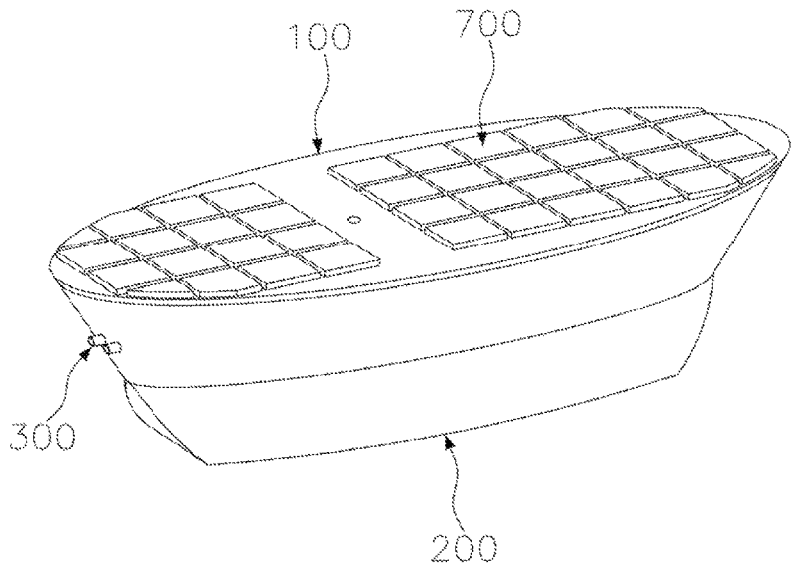
[Fig. 2]
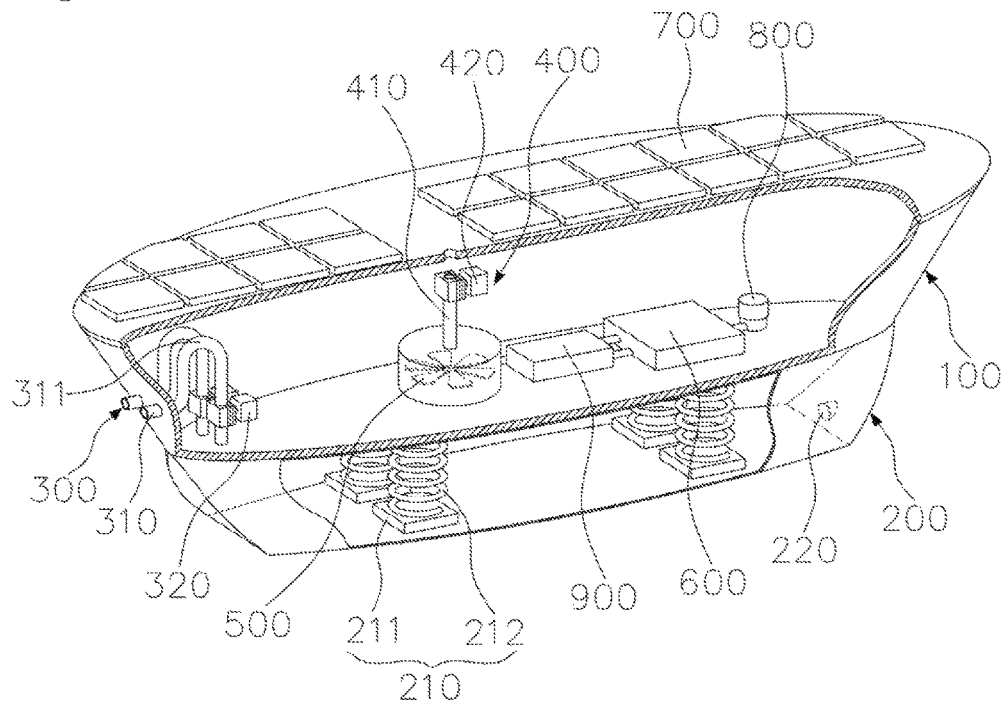

[Fig. 3]
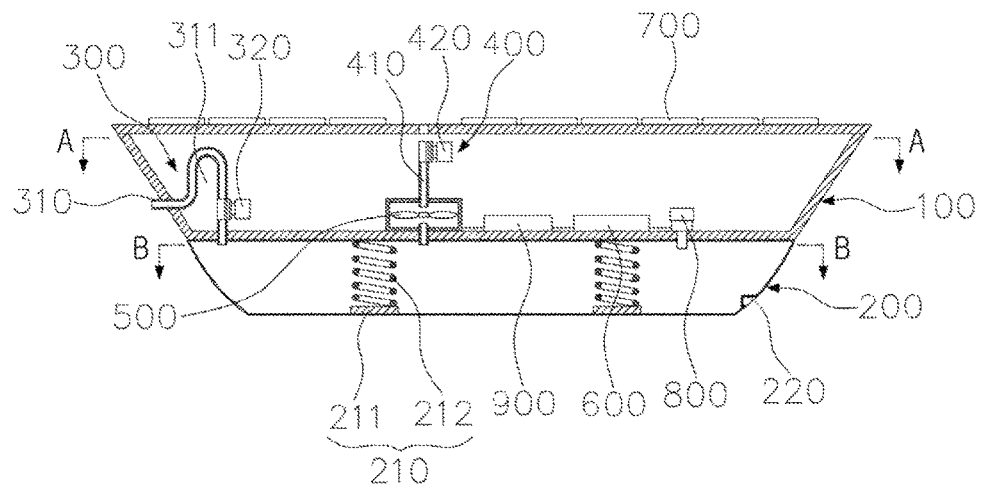
[Fig. 4]
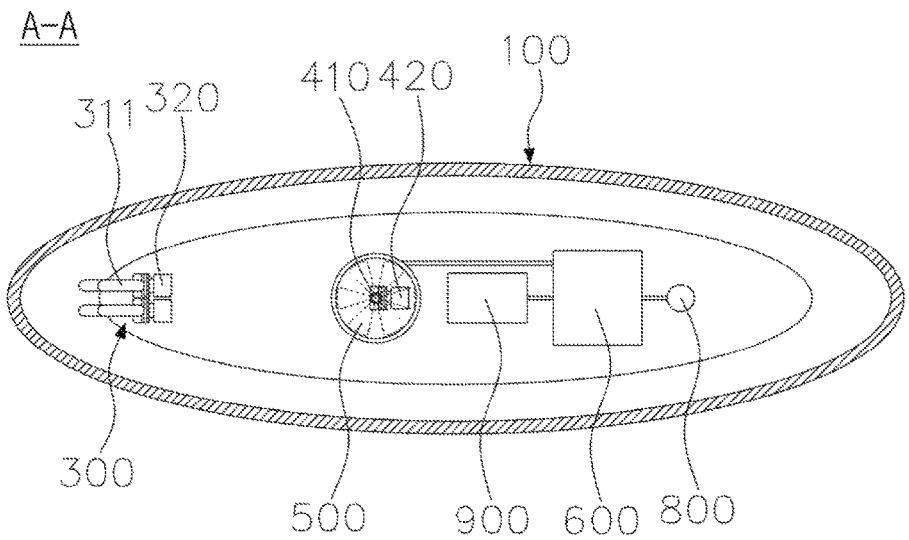

[Fig. 5]
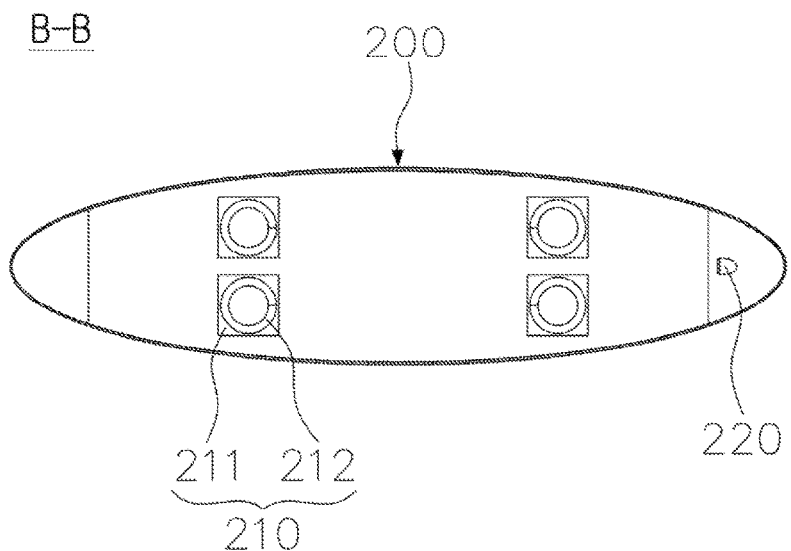
[Fig. 6]
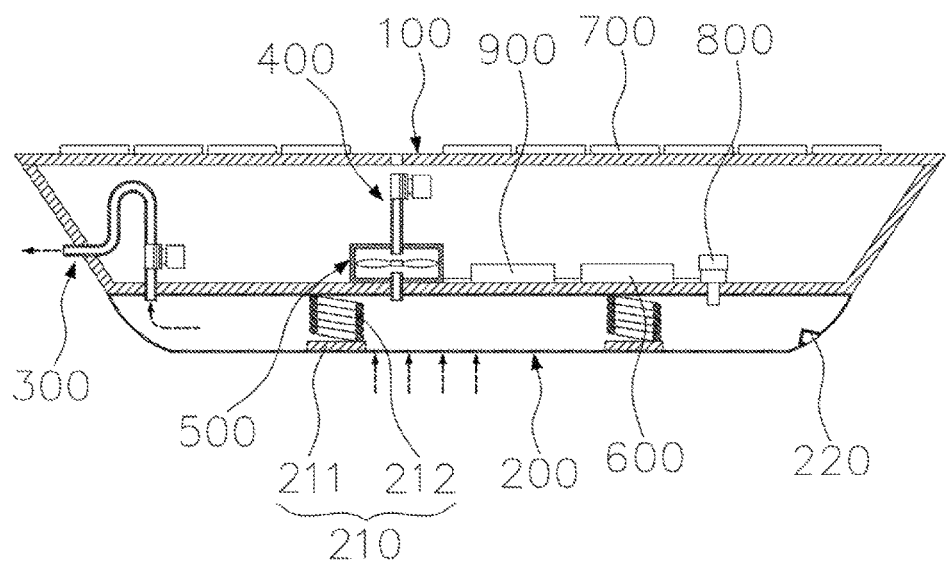

[Fig. 7]
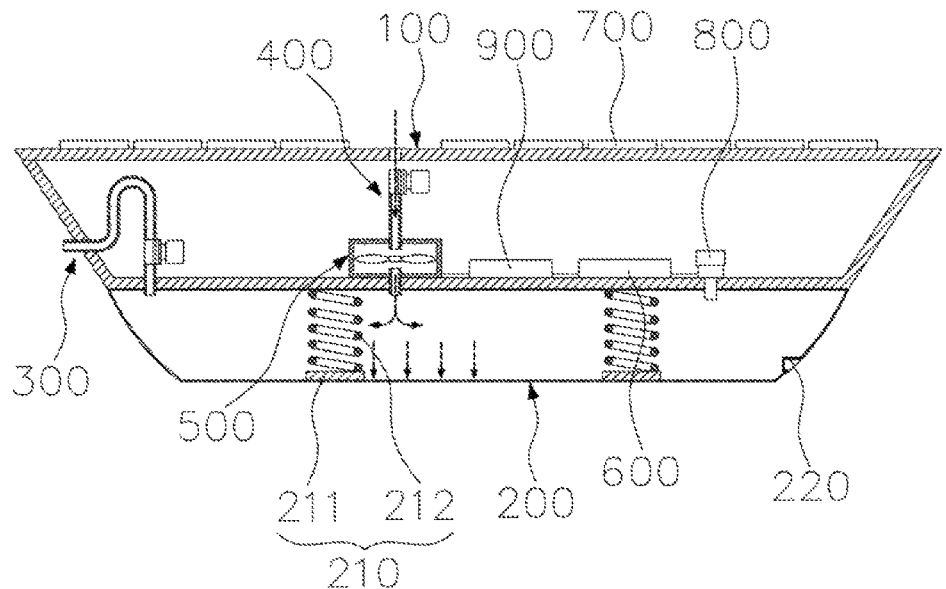
[Fig. 8]
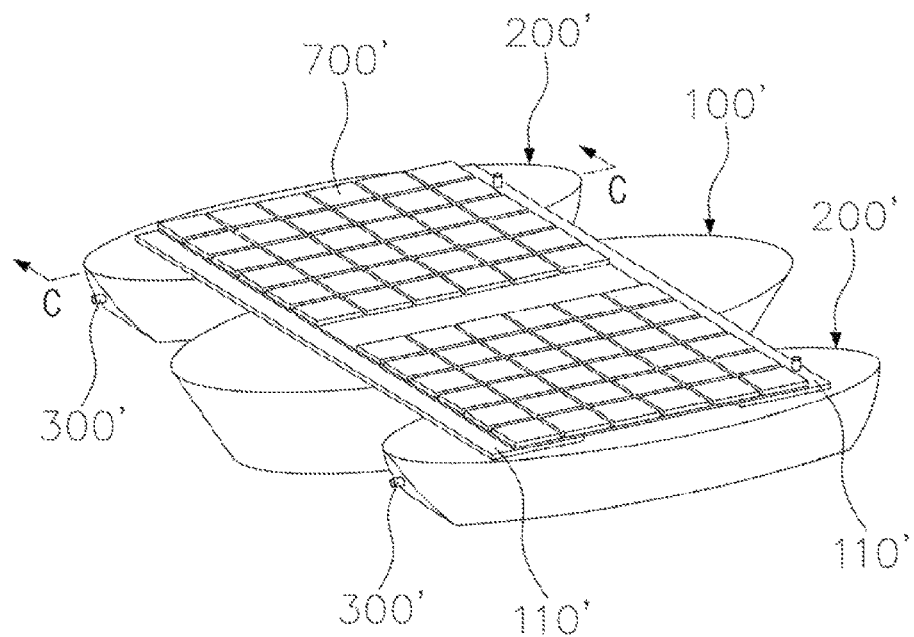

[Fig. 9]
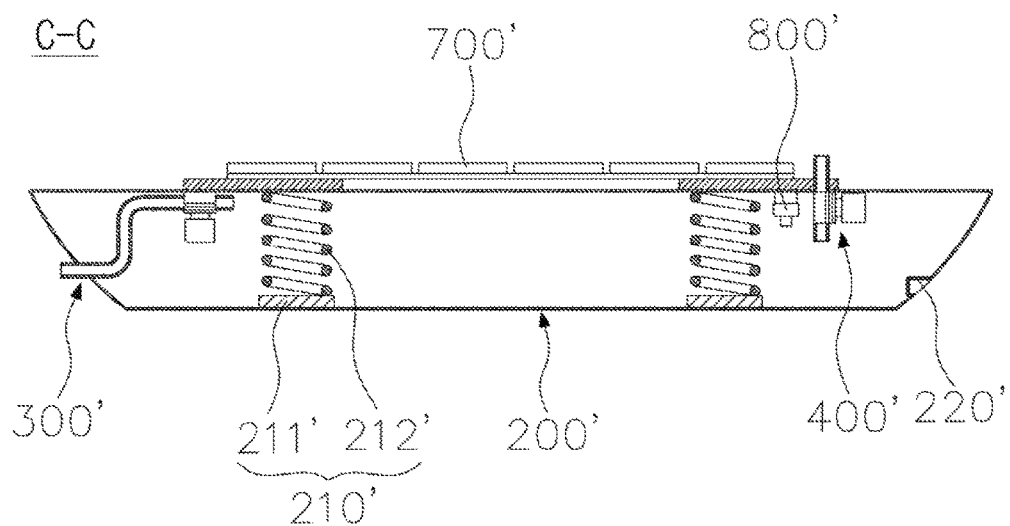

SHIP EQUIPPED WITH PROPULSION SYSTEM USING WAVE FORCE

CROSS REFERENCE TO RELATED APPLICATION

The present application claims priority to Korean Patent Application No. 10-2016-0128122, filed Oct. 5, 2016, the entire contents of which is incorporated herein for all purposes by this reference.

BACKGROUND OF THE INVENTION

Field of the Invention

The present invention relates to a ship equipped with a propulsion system using wave force and, more particularly, to a ship equipped with a propulsion system that propels the ship by converting wave force into thrust.

Description of the Related Art

Ships self-generate and consume power for sailing on the sea. The thrust for propelling ships forward is obtained from an engine using fossil fuel and the power for operating the ships is also obtained from an engine using fossil fuel.

Since the thrust and power for sailing ships are obtained from fossil fuel, environmental pollution is inevitably caused. Considering the increasing concern about the environment and increasing restrictions on exhaust gas emission, the roles of the ships using fossil fuels as the main energy source will be gradually decreased.

Accordingly, much interest is concentrated in a method of obtaining thrust for propelling a ship and power for operating the ship from eco-friendly energy sources such as tidal energy, wave force, wind force, and sunlight.

Using eco-friendly energy such as tidal force, wave force, and sunlight makes it possible to considerably reduce use of fossil fuel, prevent production of substances contaminating the atmosphere and sea, and save energy production costs.

Further, unlike a fossil fuel that should be loaded before a ship starts sailing, energy such as tidal force, wave force, wind force, and sunlight can be continuously obtained from the surroundings, so the sailing period is not limited.

Currently, research about such natural energy sources are actively being conducted around the world and some ships that are in service now have been equipped with propulsion systems and power generation systems that use eco-friendly energy to sail the ships.

The most generally used eco-friendly energy sources for ships are the sunlight and wind force, and methods of using various other energy sources such as tidal force, wave force, or a temperature difference of seawater have been studied.

However, as for the sunlight or the wind force that is most generally used, the available amount of the energy largely changes, depending on the weather conditions, so it is difficult to stably supply the energy. For example, the sunlight is influenced by the amount of clouds and the wind power is influenced by the direction of wind.

Therefore, it is required to study a method that can propel a ship using wave force that can be relatively obtained at sea and can continuously supply energy.

SUMMARY OF THE INVENTION

The present invention has been made in an effort to solve the problems and an object of the present invention is to provide a method that can obtain thrust for a ship using wave force that is eco-friendly energy. In particular, an object of the present invention is to provide a method that can minimize a loss of energy in an energy conversion process by directly converting, rather than through several steps, wave force into thrust to efficiently use the wave force.

In order to solve the objects of the present invention, a ship equipped with a propulsion system using wave force includes: a hull; a tube fixed to the hull to be at least partially submerged in water and having a variable volume; a restorer including at least elastic members pushing down a bottom of the tube to apply restoring force to the tube so that the volume of the tube is restored; an air discharge unit including an air discharge pipe connected to the tube with an end exposed in water and a first valve disposed on the air discharge pipe to open and close the air discharge pipe; and an air suction unit including an air suction pipe connected to the tube with an end exposed to the atmosphere and a second valve disposed on the air suction pipe to open and close the air suction pipe.

The ship may further include weights disposed between the bottom of the tube and the elastic members.

The first valve of the air discharge unit may be a check valve allowing air only to be discharged to water and the second valve of the air suction unit may be a check valve allowing air only to be suctioned into the tube.

The first valve of the air discharge unit may be a solenoid valve, and the ship may further include a pressure sensor for sensing internal pressure of the tube and a controller for controlling the first valve of the air discharge unit to open and close in response to sensing signals from the pressure sensor.

The air discharge unit may be disposed left and right in pair at a rear of the hull to face a rear area and the controller may independently control the pair of air discharge units to perform steering.

A curved water check portion may be formed at a middle portion of the air discharge pipe higher than the end of the air discharge pipe.

The tube may further have a drain unit for discharging water out of the tube.

The ship may further include a power generation turbine connected to the air suction pipe and a battery for storing power generated by the power generation turbine.

A solar power generation system connected to the battery and generating power to be stored in the battery may be further disposed on a top of the hull.

The ship equipped with a propulsion system using wave force according to the present invention obtains thrust from wave force, so it has eco-friendly and economical characteristics. Further, the ship directly converts wave force into the thrust, so it is possible to minimize a loss of energy in an energy conversion process and accordingly it is possible to efficiently use the wave force.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a perspective view of a ship equipped with a propulsion system using wave force according to a first embodiment of the present invention;

FIG. 2 is a conceptual view showing the internal structure shown in FIG. 1;

FIG. 3 is a vertical cross-sectional view of FIG. 1;

FIG. 4 is a cross-sectional view taken along line A-A of FIG. 3;

FIG. 5 is a cross-sectional view taken along the line B-B of FIG. 3;

FIGS. 6 and 7 are conceptual views showing the operation of the ship equipped with a propulsion system using wave force according to the first embodiment of the present invention;

FIG. 8 is a perspective view of a ship equipped with a propulsion system using wave force according to a second embodiment of the present invention; and FIG. 9 is a cross-sectional view taken along line C-C of FIG. 8.

DETAILED DESCRIPTION OF THE INVENTION

Embodiments of the present invention will be described in detail with reference to the accompanying drawings for those skilled in the art to easily achieve the present invention. However, the present invention may be achieved in various different ways and is not limited to the embodiments described herein. In the accompanying drawings, portions not related to the description will be omitted in order to clearly describe the present invention, and similar reference numerals will be used to describe similar components throughout the specification. Further, throughout the specification, unless explicitly described otherwise, "comprising" any components will be understood to imply the inclusion of other components rather than the exclusion of any other components.

A ship equipped with a propulsion system using wave force according to a first embodiment of the present invention is described hereafter in detail with reference to the drawings.

FIG. 1 is a perspective view of a ship equipped with a propulsion system using wave force according to a first embodiment of the present invention, FIG. 2 is a conceptual view showing the internal structure shown in FIG. 1, FIG. 3 is a vertical cross-sectional view of FIG. 1, FIG. 4 is a cross-sectional view taken along line A-A of FIG. 3, FIG. 5 is a cross-sectional view taken along the line B-B of FIG. 3, and FIGS. 6 and 7 are conceptual views showing the operation of the ship equipped with a propulsion system using wave force according to the first embodiment of the present invention.

The ship equipped with a propulsion system using wave force according to the first embodiment is an unmanned ocean explorer that self-generates and consumes power for both of propulsion and operation. For the convenience of description, the equipment for ocean exploration mounted on the ship is not shown and stated herein.

The ship equipped with a propulsion system using wave force according to the embodiment includes a hull 100, a tube 200, an air discharge unit 300, an air suction unit 400, a power generation turbine 500, a battery 600, a solar power generation system 700, a pressure sensor 800, and a controller 900.

The tube 200 includes a restorer 210 for restoring the volume of the tube 200.

The ship having the hull 100 shown in FIG. 1 is a monohull in the embodiment. The hull 100 is a part where equipment for ocean exploration (not shown), the power generation turbine 500, the battery 600, the solar power generation system 700 etc. are mounted.

For multihulls such as a catamaran or a trimaran, the structures of the hull and the tube combined with the hull are changed. A multihull will be described in a second embodiment.

The tube 200 is disposed under the hull 100. The tube 200 is an air bag fixed to the bottom of the hull 100 to be at least partially submerged in water.

The tube 200 is changed in volume by external pressure and, as the volume is changed, air flows into/out of the tube 200.

The tube 200 may be formed such that the internal volume is changed by a change of the entire surface area or such that the internal volume is changed by an increase or a decrease of the gap between the top and the bottom with the areas of the top and the bottom maintained.

The tube 200 of the embodiment is a rubber balloon of which the top is fixed to the bottom of the hull 100 along the edge of the bottom of the hull 100 to be entirely submerged in water.

The bottom of the tube 200 of the embodiment is relatively maintained in a predetermined shape and, the internal volume of the tube 200 is changed by the bottom moving up and down.

In order to maintain the shape of the bottom of the tube 200, the bottom of the tube 200 may be formed thicker than other portion or a separate frame may be coupled to the bottom of the tube 200.

A drain unit 220 for discharging water out of the tube 200 is disposed on the front of the tube 200. The drain unit 220 is conceptually shown in the drawings.

Although the drain unit 220 is shown as a valve in the embodiment, it may be a pump that actively discharges water out of the tube 220 using power, depending on embodiments.

The restorer 210 that applies restoration force to the tube 200 is disposed in the tube 200 to restore the volume of the tube 200.

The restorer 210 includes a plurality of weights 211 disposed on the bottom inside the tube 200 and elastic members 212 disposed in the tube 200 to push down the bottom of the tube 200.

In the embodiment, the weights 211 are metal plate having a large specific gravity and the elastic members 212 are coil springs having predetermined elasticity.

The weights 211 and the elastic members 212 make the tube 200 move down earlier than the hull 100 so that the volume of the tube 200 is restored when waves fall.

The restorer 210 may include only one of the weights 211 and the elastic members 212, depending on embodiments.

The air discharge unit 300 and the air suction unit 400 are provided so that air can flow into/out of the tube 200 while the volume of the tube 200 is changed.

The air discharge unit 300 is composed of an air discharge pipe 310 having a first end connected to the tube 200 and a second end fixed to the rear of the hull 100 to be exposed in water and a first valve 320 disposed on the air discharge pipe 310 to open/close the air discharge pipe 310.

The first valve 320 may be a check valve allowing air only to be discharged to water, but it is assumed that the first valve 320 is a solenoid valve that is controlled by the controller 900 in the embodiment.

A pair of air discharge units 300 is disposed at the rear of the hull 100 to face the rear area. The air discharge units 300 on the rear of the hull 100 are separately controlled by the controller 900 to be in charge of a steering function for controlling the forward movement direction of the hull.

That is, it is possible to control the forward movement direction of the hull 100 by controlling the air discharge pipes 310 so that air is discharged from only any one of the air discharge pipes 310 using the controller 900.

If this type of steering is not selected, a separate steering unit such as a rudder generally used in the related art is additionally needed. Obviously, a rudder may be further provided for precise steering even though the steering unit of the embodiment is provided.

The second ends of the air discharge pipes 310 are supposed to be submerged in water. Accordingly, water check portions 311 are formed at the middle portions of the air discharge pipes 310 to prevent water from flowing inside through the second ends of the air discharge pipes 310.

The water check portions 311 are formed by bending upward the middle portions of the air discharge pipes 310 higher than both ends of the air discharge pipes 310.

The air suction unit 400 is composed of an air suction pipe 410 having a first end coupled to the tube 200 and a second end exposed to the atmosphere and a second valve 420 disposed on the air suction pipe 410 to open/close the air suction pipe 410.

The second valve 420 may be a solenoid valve that is controlled by the controller 900, depending on embodiments. However, the air suction unit 400 does not require a specific function such as the steering function of the air discharge units 300, so it is assumed that the second valve 420 is a check valve allowing air only to flow into the tube 200.

The second end of the air suction pipe 410 of the air suction unit 400 is disposed upward on the top of the hull 100 and exposed to the atmosphere to suction the external air into the tube 200.

The second valve 420 on the air suction pipe 410 prevents the air in the tube 200 from flowing outside through the air suction pipe 410 even if the internal pressure of the tube 200 increases.

The power generation turbine 500 is disposed under the air suction unit 400 to be able to produce power using the air suctioned into the tube 200 through the air suction pipe 410. The battery 600 is provided to keep the power produced by the power generation turbine 500.

In the embodiment, the solar power generation system 700 is further provided to be able to obtain power from various energy sources. The solar power generation system 700 is disposed on the top of the hull 100 to be exposed to the sunlight and is electrically connected to the battery 600 so that the produced power can be stored in the battery 600.

The power generated by the power generation turbine 500 and the solar power generation system 700 is supplied to various electronic devices (not shown) for sailing the ship and the equipment (not shown) for ocean exploration, but some of the power is stored in the battery 600 to be used as emergency power.

The power generation turbine 500 that generates power using airflow and the solar power generation system 700 that generates power using the sunlight are generally used in the related art, so they are conceptually shown in the drawings.

The air discharge unit 300 and the air suction unit 400 are operated by pressure that is applied to the tube 200, and they discharge the air in the tube 200 to water to generate thrust or suction external air into the tube 200.

A pressure sensor 800 is further provided to sense rising/falling of waves from a change in pressure that is applied to the tube 200. When the pressure applied to the tube 200 is increased by rising of waves, the pressure sensor 800 senses it and transmits a sensing signal to the controller 900.

The controller 900 can control the first valves 320 of the air discharge unit 300 to open the air discharge pipes 310 in response to the sensing signal transmitted from the pressure sensor 800.

When the air discharge pipes 310 are opened, the air in the tube 200 is discharged to water by the high internal pressure of the tube 200 and the force of the discharged air is used as thrust, thereby propelling the hull 100.

When waves fall and the internal pressure of the tube 200 decreases, the controller 900 controls the first valves 320 to close the air discharge pipes 310 so that the air in the tube 200 is not discharged outside any more.

Further, the volume of the tube 200 is restored by the restorer 210 in the tube 200. That is, the bottom of the tube 200 is moved down earlier than the hull 100 by the weights 211 on the bottom in the tube 200 and the elastic members 212 pushing down the bottom of the tube 200, so the volume of the tube 200 is restored.

When the volume of the tube 200 is restored, the internal pressure of the tube 200 decreases and external air is suctioned into the tube 200 through the air suction pipe 410 having the second valve 420 of the air suction unit 400.

Rising and falling of waves are converted into thrust by repeating this process, so the hull 100 is propelled.

Since the ship equipped with a propulsion system using wave force of the embodiment directly converts wave force into thrust, unlike the method of generating power using wave force and then generating thrust by operating a motor using the power in the related art, it is possible to considerably reduce a loss of energy in the process of converting energy. Further, an energy conversion process having several steps is removed, the structure can be simplified.

A ship equipped with a propulsion system using wave force according to a second embodiment of the present invention is described hereafter.

FIG. 8 is a perspective view showing ship equipped with a propulsion system using wave force according to a second embodiment of the present invention and FIG. 9 is a conceptual cross-sectional view taken along line C-C of FIG. 8.

The embodiment relates to a trimaran in which a tube 200' is fixed to the left and right sides of a hull 100'.

That is, tube-fixing bars 110' extending over the left and right sides of the hull 100' are provided to fix the tubes 200' to the left and right sides of the hull 100' and the tubes 200' are fixed to both ends of the tube-fixing bars 110'.

Only the tops of the tubes 200' are partially fixed to the tube-fixing bars 110' of the hull 100'. Accordingly, there is need for a measure for maintaining the shapes of the tops and bottoms of the tubes 200' while the volumes of the tubes 200' are changed.

In order to maintain the shape of the tops and bottoms of the tubes 200', the tops and bottoms of the tubes 200' may be formed thicker than other portion or separate frames for fixing the shapes of the tops and bottoms of the tubes 200' may be provided.

According to the embodiment, the tubes 200' are fixed not to the bottom of the hull 100', but to both ends of the tube-fixing bars 110', so only the bottoms of the tubes 200' are submerged in water.

Weights 211' and elastic members 212' of restorers 210' in the tubes 200' are provided in a similar way to those of the first embodiment. The weights 211' are fixed on the bottoms in the tubes 200' and the elastic members 212' are also disposed in the tubes 200' to push down the bottoms of the tubes 200'.

A water discharge unit 220' is disposed on the fronts of the tubes 200' and has the same structure and function as that of the first embodiment.

Air discharge units 300' and air suction units 400' are provided in a similar way to those of the first embodiment. However, unlike the air discharge units 300 that are fixed to the hull 100 to be exposed in water in the first embodiment, the air discharge units 300' are disposed at the rears of the tubes 200' to be exposed in water.

Further, pressure sensors 800' are provided to be able to sense rising/falling of waves from a change in internal pressure of the tubes 200'. The pressure sensors 800' are also fixed in the tubes 200'.

The shapes of the air discharge units 300', air suction units 400', and pressure sensors 800' will be easily understood through FIG. 9.

A controller (not shown) and a battery (not shown) are provided in the same way as the first embodiment and are disposed inside the hull 100', so they are not shown in the figures.

Further, a solar power generation system 700' is disposed in the wide area on the tube-fixing bars 110' on the hull 100'.

The second embodiment is just an example for showing that a ship equipped with a propulsion system using wave force according to the present invention can be implemented in a multihull type. Accordingly, the details may be modified by those skilled in the art.

The above description is an example of the present invention and those skilled in the art may understand that the present invention may be easily modified in other ways without changing the necessary characteristics or the spirit of the present invention.

Therefore, it should be understood that the exemplary embodiments are not limiting but illustrative in all aspects. For example, the single components may be divided, respectively, and the separate components may be combined.

The scope of the present invention is defined by not the specification, but the following claims, and all of changes and modifications obtained from the meaning and range of claims and equivalent concepts should be construed as being included in the scope of the present invention.

What is claimed is:

1. A ship equipped with a propulsion system using wave force, the ship comprising:
   a hull;
   a tube fixed to the hull to be at least partially submerged in water and having a variable volume;
   a restorer including at least elastic members pushing down a bottom of the tube to apply restoring force to the tube so that the volume of the tube is restored;
   an air discharge unit including an air discharge pipe connected to the tube with an end exposed in water and a first valve disposed on the air discharge pipe to open and close the air discharge pipe; and
   an air suction unit including an air suction pipe connected to the tube with an end exposed to the atmosphere and a second valve disposed on the air suction pipe to open and close the air suction pipe.

2. The ship of claim 1, further comprising weights disposed between the bottom of the tube and the elastic members.

3. The ship of claim 1, wherein the first valve of the air discharge unit is a check valve allowing air only to be discharged to water and the second valve of the air suction unit is a check valve allowing air only to be suctioned into the tube.

4. The ship of claim 1, wherein the first valve of the air discharge unit is a solenoid valve, and
   the ship further comprises a pressure sensor sensing internal pressure of the tube and a controller controlling the first valve of the air discharge unit to open and close in response to sensing signals from the pressure sensor.

5. The ship of claim 4, wherein the air discharge unit is disposed left and right in pair at a rear of the hull to face a rear area and the controller independently controls the pair of air discharge units to perform steering.

6. The ship of claim 1, wherein a curved water check portion is formed at a middle portion of the air discharge pipe higher than the end of the air discharge pipe.

7. The ship of claim 1, the tube further has a drain unit for discharging water out of the tube.

8. The ship of claim 1, further comprising a power generation turbine connected to the air suction pipe and a battery for storing power generated by the power generation turbine.

9. The ship of claim 8, wherein a solar power generation system connected to the battery and generating power to be stored in the battery is further disposed on a top of the hull.

* * * * *